(12) United States Patent
Dorner et al.

(10) Patent No.: US 9,785,649 B1
(45) Date of Patent: Oct. 10, 2017

(54) HUE-BASED COLOR NAMING FOR AN IMAGE

(71) Applicant: Amazon Technologies, Inc., Reno, NV (US)

(72) Inventors: Charles Shearer Dorner, Seattle, WA (US); Jenny Ann Blackburn, Seattle, WA (US); Eva Manolis, Bellevue, WA (US); Timothy Andrew Ong, Sammamish, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 14/475,401

(22) Filed: Sep. 2, 2014

(51) Int. Cl.
*G06T 7/40* (2017.01)
*G06F 17/30* (2006.01)
*G06K 9/46* (2006.01)

(52) U.S. Cl.
CPC .... *G06F 17/3025* (2013.01); *G06F 17/30274* (2013.01); *G06F 17/30867* (2013.01); *G06K 9/4652* (2013.01); *G06T 7/408* (2013.01); *G06T 2207/10024* (2013.01)

(58) Field of Classification Search
None
See application file for complete search history.

(56) References Cited

U.S. PATENT DOCUMENTS

| | | |
|---|---|---|
| 5,508,718 A | 4/1996 | Haikin |
| 5,544,284 A | 8/1996 | Allebach et al. |
| 5,684,895 A | 11/1997 | Harrington |
| 5,822,503 A | 10/1998 | Gass, Jr. et al. |
| 6,014,125 A | 1/2000 | Herbert |
| 6,081,276 A | 6/2000 | Delp |
| 6,124,945 A | 9/2000 | Ishihara et al. |
| 6,385,336 B1 | 5/2002 | Jin |

(Continued)

FOREIGN PATENT DOCUMENTS

| | | |
|---|---|---|
| JP | 2012-221317 A | 11/2012 |
| WO | WO 2014/070914 A1 | 5/2014 |

(Continued)

OTHER PUBLICATIONS

"Color Name & Hue"—waybackmachine archive date of May 16, 2013, pp. 1-2.*

(Continued)

*Primary Examiner* — Bernard Krasnic
(74) *Attorney, Agent, or Firm* — Knobbe, Martens, Olson & Bear, LLP

(57) ABSTRACT

Systems and methods are provided for associating colors or color names with a color image based on hue. A set of hue values can be extracted from color data, such as a color palette, corresponding to a color image. A representative hue can be derived from the set of hue values. Colors included in the color data that are attributable to the representative hue can be identified and one or more colors can be derived therefrom as representative of a subject depicted by the color image. Color names matching the representative colors can be identified and associated with the color image. In particular, a common color name can be determined therefrom and associated with the subject of the color image.

20 Claims, 5 Drawing Sheets

(56) References Cited

U.S. PATENT DOCUMENTS

| | | |
|---|---|---|
| 6,513,014 B1 | 1/2003 | Walker et al. |
| 6,577,759 B1 | 6/2003 | Caron et al. |
| 7,136,074 B2 | 11/2006 | Hussie |
| 7,444,658 B1 | 10/2008 | Matz et al. |
| 7,801,893 B2 | 9/2010 | Gulli' et al. |
| 7,961,938 B1 | 6/2011 | Remedios |
| 8,416,255 B1 | 4/2013 | Gilra |
| 8,553,045 B2 | 10/2013 | Skaff et al. |
| 8,576,241 B1 | 11/2013 | Kanter et al. |
| 8,634,640 B2 | 1/2014 | Bhatti et al. |
| 8,762,419 B2 | 6/2014 | Moroney |
| 8,867,798 B2 | 10/2014 | Shuster |
| 9,047,804 B1 | 6/2015 | Moroney et al. |
| 9,135,719 B1 | 9/2015 | Dorner et al. |
| 9,177,391 B1 | 11/2015 | Dorner et al. |
| 9,245,350 B1 | 1/2016 | Dorner et al. |
| 9,311,889 B1 | 4/2016 | Dorner et al. |
| 9,396,560 B2 | 7/2016 | Dorner et al. |
| 9,401,032 B1 | 7/2016 | Dorner et al. |
| 9,514,543 B2 | 12/2016 | Dorner et al. |
| 9,524,563 B2 | 12/2016 | Sayre et al. |
| 9,542,704 B2 | 1/2017 | Dorner et al. |
| 9,552,656 B2 | 1/2017 | Dorner et al. |
| 9,633,448 B1 | 4/2017 | Dorner |
| 2001/0028464 A1 | 10/2001 | Aritomi |
| 2002/0080153 A1 | 6/2002 | Zhao et al. |
| 2003/0004938 A1 | 1/2003 | Lawder |
| 2003/0011612 A1 | 1/2003 | Luo et al. |
| 2003/0083850 A1 | 5/2003 | Schmidt et al. |
| 2003/0142124 A1 | 7/2003 | Takata et al. |
| 2003/0146925 A1 | 8/2003 | Zhao et al. |
| 2004/0090453 A1 | 5/2004 | Jasinschi et al. |
| 2005/0122427 A1 | 6/2005 | Hougui et al. |
| 2005/0149411 A1 | 7/2005 | Colwell |
| 2005/0222978 A1 | 10/2005 | Drory et al. |
| 2006/0023082 A1 | 2/2006 | Higuchi |
| 2006/0066629 A1 | 3/2006 | Norlander et al. |
| 2006/0248081 A1 | 11/2006 | Lamy |
| 2006/0250669 A1 | 11/2006 | Beretta |
| 2006/0268120 A1 | 11/2006 | Funakura et al. |
| 2007/0100786 A1 | 5/2007 | Moroney |
| 2008/0003547 A1 | 1/2008 | Woolfe et al. |
| 2008/0025629 A1 | 1/2008 | Obrador et al. |
| 2008/0025647 A1 | 1/2008 | Obrador et al. |
| 2008/0046410 A1 | 2/2008 | Lieb |
| 2008/0046424 A1 | 2/2008 | Horton |
| 2008/0069442 A1 | 3/2008 | Itoh |
| 2008/0301582 A1 | 12/2008 | Gluck |
| 2008/0317336 A1* | 12/2008 | Mojsilovic ............... G06T 7/408 382/162 |
| 2009/0027414 A1 | 1/2009 | Vaughn |
| 2009/0041345 A1 | 2/2009 | Tirumalareddy et al. |
| 2009/0055758 A1 | 2/2009 | Sim et al. |
| 2009/0157595 A1 | 6/2009 | Gubitz |
| 2009/0227375 A1 | 9/2009 | Weisman et al. |
| 2009/0248626 A1 | 10/2009 | Miller |
| 2009/0259567 A1 | 10/2009 | Watts |
| 2009/0281925 A1* | 11/2009 | Winter ................ G06F 17/3025 705/26.1 |
| 2010/0027834 A1 | 2/2010 | Spitzig et al. |
| 2010/0053201 A1 | 3/2010 | Klassen et al. |
| 2010/0082654 A1 | 4/2010 | Zhang et al. |
| 2010/0110455 A1 | 5/2010 | Woolfe |
| 2010/0158412 A1 | 6/2010 | Wang et al. |
| 2011/0135195 A1 | 6/2011 | Marchesotti et al. |
| 2011/0205231 A1 | 8/2011 | Hartley et al. |
| 2011/0305386 A1* | 12/2011 | Wang ....................... H04N 1/56 382/164 |
| 2011/0319160 A1 | 12/2011 | Arn et al. |
| 2012/0036163 A1 | 2/2012 | Myers et al. |
| 2012/0045121 A1 | 2/2012 | Youngman et al. |
| 2012/0075329 A1 | 3/2012 | Skaff et al. |
| 2012/0099784 A1 | 4/2012 | Marchesotti et al. |
| 2012/0099788 A1 | 4/2012 | Bhatti et al. |
| 2012/0109944 A1 | 5/2012 | Hao |
| 2012/0154420 A1 | 6/2012 | Calandrino et al. |
| 2012/0163710 A1 | 6/2012 | Skaff et al. |
| 2012/0206477 A1 | 8/2012 | Yanagisawa |
| 2013/0013991 A1 | 1/2013 | Evans |
| 2013/0033603 A1 | 2/2013 | Suzuki et al. |
| 2013/0050238 A1 | 2/2013 | Bergou et al. |
| 2013/0148741 A1 | 6/2013 | Steinberg et al. |
| 2013/0226659 A1 | 8/2013 | Patel et al. |
| 2013/0227636 A1 | 8/2013 | Bettini et al. |
| 2013/0235398 A1 | 9/2013 | Bhatti et al. |
| 2013/0266217 A1 | 10/2013 | Gershon et al. |
| 2014/0037200 A1 | 2/2014 | Phillips et al. |
| 2014/0044349 A1* | 2/2014 | Wang .................. G06F 17/3025 382/162 |
| 2014/0049799 A1 | 2/2014 | Li et al. |
| 2014/0052584 A1 | 2/2014 | Gershon et al. |
| 2014/0067014 A1 | 3/2014 | Kaula et al. |
| 2014/0089781 A1 | 3/2014 | Hoguet |
| 2014/0153821 A1 | 6/2014 | Masuko et al. |
| 2014/0177952 A1 | 6/2014 | Masuko |
| 2014/0189476 A1 | 7/2014 | Berthelot et al. |
| 2014/0270498 A1 | 9/2014 | Chester et al. |
| 2014/0300775 A1 | 10/2014 | Fan et al. |
| 2014/0304661 A1 | 10/2014 | Topakas et al. |
| 2014/0334722 A1* | 11/2014 | Bloore ................. G06K 9/4652 382/164 |
| 2014/0355874 A1* | 12/2014 | Sakamaki .............. H04N 1/622 382/165 |
| 2015/0235110 A1 | 8/2015 | Curtis et al. |
| 2015/0235389 A1 | 8/2015 | Miller et al. |
| 2015/0262549 A1 | 9/2015 | Moroney |
| 2015/0269747 A1 | 9/2015 | Hogan et al. |
| 2015/0324392 A1 | 11/2015 | Becker et al. |
| 2015/0324394 A1 | 11/2015 | Becker et al. |
| 2015/0332479 A1 | 11/2015 | Gershon et al. |
| 2015/0378999 A1 | 12/2015 | Dorner et al. |
| 2015/0379000 A1 | 12/2015 | Haitani et al. |
| 2015/0379001 A1 | 12/2015 | Gunningham et al. |
| 2015/0379002 A1 | 12/2015 | Dorner et al. |
| 2015/0379003 A1 | 12/2015 | Dorner et al. |
| 2015/0379004 A1 | 12/2015 | Sayre et al. |
| 2015/0379005 A1 | 12/2015 | Dorner et al. |
| 2015/0379006 A1 | 12/2015 | Dorner et al. |
| 2015/0379071 A1 | 12/2015 | Dorner et al. |
| 2015/0379608 A1 | 12/2015 | Dorner et al. |
| 2015/0379731 A1 | 12/2015 | Dorner et al. |
| 2015/0379732 A1 | 12/2015 | Sayre et al. |
| 2015/0379733 A1 | 12/2015 | Dorner et al. |
| 2015/0379738 A1 | 12/2015 | Gunningham et al. |
| 2015/0379739 A1 | 12/2015 | Dorner et al. |
| 2015/0379743 A1 | 12/2015 | Dorner et al. |
| 2015/0379959 A1 | 12/2015 | Dorner et al. |
| 2016/0005188 A1 | 1/2016 | Dorner et al. |
| 2016/0005201 A1 | 1/2016 | Kunkel et al. |
| 2016/0104303 A1 | 4/2016 | Dorner et al. |
| 2016/0335784 A1 | 11/2016 | Dorner et al. |
| 2017/0084053 A1 | 3/2017 | Dorner et al. |
| 2017/0098314 A1 | 4/2017 | Sayre et al. |

FOREIGN PATENT DOCUMENTS

| | | |
|---|---|---|
| WO | WO 2015/145766 A1 | 10/2015 |
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

"HTML Color Picker"—waybackmachine archive date of Feb. 15, 2013, 1 page.*
"Color Blind Assistant"—iPhone apps versions 2.61 and 2.62, Release date Oct. 14-15, 2009, pp. 1-7.*
"Tin Eye Labs"—waybackmachine archive date of Sep. 20, 2012, pp. 1-3.*
"Exalead CloudView Semantics Whitepaper," Doc. No. EN.140. 001.0-V1.2; Oct. 2010, pp. 1-30. Retrieved from http:www.3ds.

(56) References Cited

OTHER PUBLICATIONS com/fileadmin/PRODUCTS/EXALEAD/Documents/whitepapers/Exalead-CloudView-Semantics-EN.pdf on Aug. 24, 2015.

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Das et al., "Indexing flowers by color names using domain knowledge-driven segmentation," Proc. The Fourth IEEE Workshop on Applications of Computer Vision; pp. 94-99; 1998.

Dorner, C.S., Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Wang et al., "Contextual Dominant Color Name Extraction for Web Image Search," 2012 IEEE International Conference on Multimedia and Expo Workshops (ICMEW), pp. 319-324.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 mailed on Oct. 1, 2015.

International Search Report and Written Opinion in PCT/US2015/037456 mailed on Sep. 9, 2015.

International Search Report and Written Opinion in PCT/US2015/037494 mailed on Sep. 14, 2015.

International Search Report and Written Opinion in PCT/US2015/037465 mailed on Oct. 27, 2015.

International Search Report and Written Opinion in PCT/US2015/037481 mailed on Sep. 14, 2015.

Dorner, C.S., Image-Based Color Palette Generation, U.S. Appl. No. 14/316,483, filed Jun. 26, 2014.

Bell, E., Color Detection: Technology on Heels With Lyst Engineering, dated Feb. 22, 2014, retrieved Apr. 7, 2014, <http://developers.lyst.com/datatimages/2014/02/22/color-detection/>.

Luo, J., et al., "Novel Color Palettization Scheme for Preserving Important Colors," Proceedings SPIE 5008. Color Imaging VIII: Processing, Hardcopy, and Applications; Jan. 20, 2003.

Montagne, C., et al., "Adaptive Color Quantization Using the Baker's Transformation," J. Electronic Imaging 15(2), Apr.-Jun. 2006, 21 pages.

Periasamy, P.S., et al., "A Common Palette Creation Algorithm for Multiple Images with Transparency Information," Procedeedings of the International Conference on Advances in Computing, Control, and Telecommunication Techologies, IEEE 2009.

Yu, M.P., et al., "Contextual Algorithm for Color Quantization," J. Electronic Imaging 12(3):442-447, Jul. 2003.

Das et al, Indexing Flower Patent Images Using Domain Knowledge, IEEE Intelligent Systems, vol. 14, No. 5; 1999, pp. 24-33.

Delon, J., et al., Automatic Color Palette, Proceedings of the International Conference on Image Processing, vol. 2, Sep. 11-14, 2005, pp. 706-709.

Nickerson, D., et al., Central Notations for ISCC-NBS Color Names, Journal of the Optical Society of America, vol. 31, pp. 587-591, Sep. 1941.

Balasubramanian, Raja, et al.; Sequential Scalar Quantization of Color Images, Journal of Electronic Imaging, vol. 3, No. 1, pp. 45-59; Jan. 1994.

\* cited by examiner

HUE-BASED COLOR NAMING FOR AN IMAGE

BACKGROUND

In many computing-centric commerce models, a particular network resource (e.g., a commerce network site) can present items associated with various colors. Often, individual sellers can provide color-related information about the item for sale, such as one or more color images depicting the item. A person interested in an item of a particular color may utilize a network resource, such as the commerce network site, to browse items associated with different colors.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
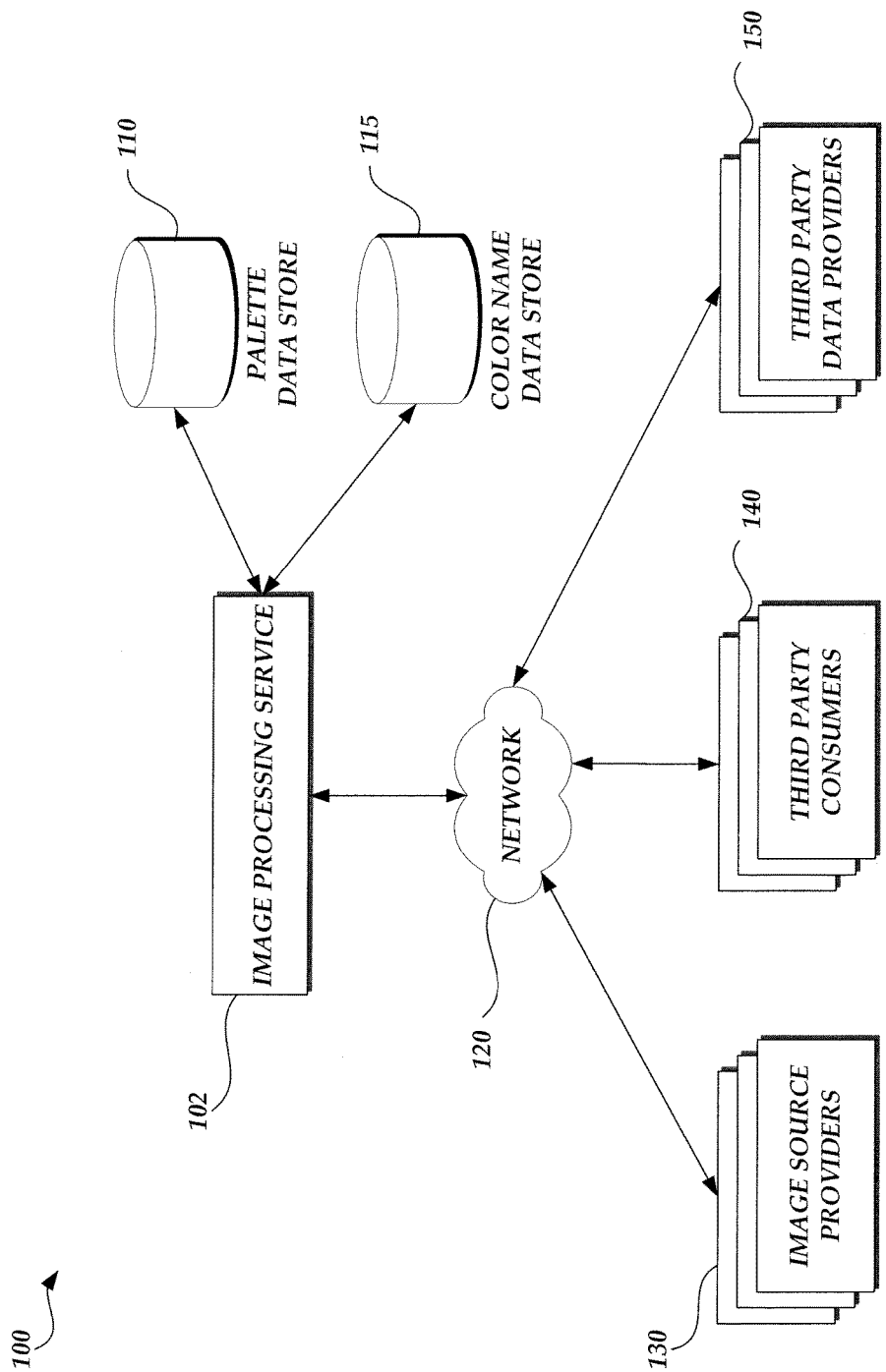
FIG. 1 is a block diagram illustrating one embodiment of an operating environment including an image processing service for hue-based color naming.

Generally described, the present disclosure corresponds to methods and systems for color image processing. In many occasions, the host of a commerce or other network site, a merchandise provider or vendor utilizing the network or site, or a consumer visiting the site may wish to automatically associate color names with color images to facilitate sales of items of various colors. For example, color images depicting items for sale can be indexed by their associated color names, which may enable consumers to efficiently search for items using color names. Aspects of the present disclosure relate to determining a representative hue of a color image and one or more colors depicted in the color image that correspond to the representative hue. Other aspects of the present disclosure relate to identifying color names that match the one or more colors and associating a common matching color name with the subject of the color image (e.g., an item for sale as depicted by the image.)

In accordance with an illustrative embodiment, an image processing service obtains color data corresponding to a color image depicting one or more items, a design, a scene, or the like. The color data may be the color image in its original format, a pre-processed color image or other representation of colors depicted by the color image, with or without associated metadata. Illustratively, the color data can be a color palette generated from the color image. For an example of generating a color palette from a color image, see U.S. patent application Ser. No. 14/316,483, entitled "IMAGE-BASED COLOR PALETTE GENERATION," filed on Jun. 26, 2014, which is incorporated by reference herein in its entirety.

The image processing service can extract hue values from the color data. Hue is typically one of the properties used to determine a particular color. For example, a color can be represented as a three-dimensional vector in an HSB (Hue-Saturation-Brightness) color space, where hues range from 0 to 360 degrees. Illustratively, hues can define a color circle representing pure colors (e.g., "RED" at 0 degrees, "GREEN" at 120 degrees and "BLUE" at 240 degrees.) The image processing service can further generate a distribution of hue values, group and merge hues, and determine a representative hue of the color image. For example, the image processing service can select the dominant hue (e.g., a hue associated with most pixels of the color image) as the representative hue.

The image processing service can then determine color(s) depicted by the color image that correspond to the representative hue. Because hue merely specifies one out of typically three attributes that define a certain color, there may be more than one corresponding color that is determined for the same representative hue. In some embodiments, the image processing service may calculate a weighted average of the determined colors and associate the average color as a color of the subject of the color image.

The image processing service can then determine color names based on the determined colors. In some embodiments, the image processing service can identify color names that match the colors corresponding to the representative hue. For example, a mapping between color names (e.g., textual representations of colors) and colors (e.g., values represented in a color space) can be derived from a human survey of color names. The mapping may be hierarchical or fuzzy, such that a specific color may match multiple color names, and vice versa. Some or all of the matching color names can be associated with the color image, e.g., as part of indexing information for the color images, to facilitate a search based on color names. In other embodiments, the image processing service may identify a common color name that matches a majority or all of the colors corresponding to the representative hue. The common color name may be associated with the subject depicted by the color image, e.g., by storing the common color name as metadata that accompanies the color image.

All the processes disclosed herein, including the determination of representative hue, corresponding colors, or color names, may be facilitated or controlled by various criteria, preferences, or biases that are related to language, country, geographic region, ethnic group, social community, gender, age, time, trend, item, category of items, service, category of services, design, category of designs, color popularity, related item sales or the like. For example, color names associated with animals and/or exotic animals may be excluded from the determination processes if the image depicts a clothing item.

While a retail or commerce environment is often used as an example below, it will be appreciated by a person of skill in the relevant art that colors, color names, images, metadata, or the like, as disclosed herein, may be used in a variety of environments other than a retail environment. For example, aspects of the present disclosure, in some embodiments, may be used and/or implemented within any user interface, page, video, electronic book and/or other electronic content. In addition, aspects of the present disclosure, in some embodiments, may be used by consumers, merchandisers, designers, architects, artists, landscapers, developers, gamers, students, etc. for virtually any purpose. Without limitation, aspects of the present disclosure may be used in social networking contexts, digital photo albums, digital news articles and/or visual bookmarking contexts. For illustrative purposes, images are often described below in the context of items listed in an electronic catalog. Alternatively, in other embodiments, item images that may be presented according to the systems and methods described herein may include advertisements, images in news articles, editorial content, videos, classified listings, auction listings and/or any other content that may be electronically presented to a user.

Overview of an Example Embodiment

FIG. 1 illustrates an embodiment of an operating environment 100 that can implement the features described herein in the context of an example image processing service 102. In some embodiments, the operating environment 100 includes the image processing service 102, a palette data store 110, a color name data store 115, a network 120, image source providers 130, third party consumers 140 and third party data providers 150. In some embodiments, various components of the operating environment 100 are communicatively interconnected with one another via the network 120. The operating environment 100 may include different components, a greater or fewer number of components, and can be structured differently. For example, there can be other data stores or computing devices in connection with the image processing service 102. As another example, components of the operating environment 100 may communicate with one another with or without the network 120.

The image processing service 102 can correspond to any system capable of performing the processes described herein. The image processing service 102 may be implemented by one or more computing devices. For example, the image processing service 102 may be implemented by computing devices that include one or more processors to execute one or more instructions stored in memory, and communication devices to transmit and receive data over the network 120. In some embodiments, the image processing service 102 is implemented on one or more backend servers capable of communicating over a network. In other embodiments, the image processing service 102 is implemented by one or more virtual machines in a hosted computing environment (e.g., a "cloud" computing environment). The hosted computing environment may include one or more provisioned and released computing resources, which computing resources may include computing, networking and/or storage devices.

In one aspect, the image processing service 102 can implement one or more applications that perform, individually or in combination, the image processing functions described herein, including representative hue determination, representative color determination, color name identification and association, etc. In another aspect, the image processing service 102 may be configured to store or update information maintained at the palette data store 110 or color name data store 115. In some embodiments, the image processing service 102 is associated with a network or network-based merchandise provider or vendor.

In the illustrated embodiment, the image processing service 102 may be communicatively connected to the palette data store 110. The palette data store 110 can generally include any repository, database or information storage system that can store palette data and associated metadata. The palette data stored in the palette data store 110 can be collections of colors or hues, with associated weight(s) and dates of creation(s). Palette data can be stored in various formats, such as lists, vectors, arrays, matrices, etc. Metadata can be associated with individual palettes, for purposes of indicating their format, semantics, features, conditions, sources, date of creation/editing, associated demographics (e.g., geographical region, age, gender, ethnic group, religion, etc. of users that provided input used in creating the palette), or the like. For example, metadata can link a palette to a corresponding color image from which the palette is derived. Alternatively, or in addition, metadata may indicate a category or a position in a taxonomy associated with the corresponding color image. As another example, metadata may indicate patterns, colocations, or other attributes of spatial distribution of palette colors within the corresponding color image. Illustratively, metadata may indicate whether palette colors or hues appear adjacent to one another, displayed in a scattered or concentrated form, correlated in locations within an image, or the like.

In the illustrated embodiment, the image processing service 102 may be communicatively connected to the color name data store 115. The color name data store 115 can generally include any repository, database, or information storage system that can store color name related data. Data stored in the color name data store 115 can be data regarding relationships between a collection of color names and colors in a color space. For example, the relationships can be one-to-one, one-to-multiple, multiple-to-one, multiple-to-multiple, hierarchical, probabilistic, or fuzzy mappings between any set or subset of color names and colors. The relationships can optionally be associated with weights, conditions, contexts, sources, dates of creation/editing, other associated metadata (e.g., geographical region, age, gender, ethnic group, religion, culture, language, dialect, preferences, social communities or networks, etc. of sources that contributed to the data) or the like.

Illustratively, color names may be any type of color identifier, including names expressed using ASCII characters, symbols, icons, or other such data. Color names may be provided by one or more surveys such as a human survey of color names and/or human generated data of color names. For example, a human color survey may have included hundreds of thousands of users to name millions of RED, GREEN, BLUE ("RGB") colors. Furthermore, the color names from a color survey may be associated with ranking and/or voting data indicating relative human preferences for color names. For example, out of thousands of survey participants, the color name "lime" may receive the highest votes for a particular RGB color value, such as (50, 205, 50). A person of skill in the art will appreciate that a color name can be mapped to a same color, which can be represented differently in different color spaces. The color names from a human color survey may be richer and/or more accurate than standard color naming data stores and/or data sources. For example, color names based on a color survey may include names that are not typical color names but that are highly suggestive of color, such as "lime," "asparagus," or the like. The data from such a survey may be stored (possibly after appropriate derivation or conversion) in the color name data store 110.

As another example, time-dependent ratings can be used to determine trends of relationships between color names and colors. Illustratively, the most popular colors associated with a color name can be tracked as a function of time, with the result plotted in a color space. The path through the color space of the most popular color (e.g., which color is the most popular color at a point in time) can be used to project what the most popular color will be at some point in the future. As still another example, geographical information can be included with color survey data. Illustratively, users within a geographical region may prefer particular associations between color names and colors.

The network 120 may include any suitable combination of networking hardware and protocols necessary to establish communications within the operating environment 100. For example, the network 120 may include private networks such as local area networks (LANs) or wide area networks (WANs), as well as public or private wired or wireless networks, satellite networks, cable networks, cellular networks, the Internet, or any combination thereof. In such an embodiment, the network 120 may include hardware (e.g., modems, routers, switches, load balancers, proxy servers, etc.) and software (e.g., protocol stacks, accounting software, firewall/security software, etc.) implemented by hardware that establishes networking links within the operating environment 100. Additionally, the network 120 may implement one of various communication protocols for transmitting data between components of the operating environment 100.

The image source providers 130 may correspond to hosts of a commerce or other network site, merchandise providers or vendors, designers, photographers, artists, social network sites, or the like, and can be associated with any computing device(s) that can facilitate communication with the image processing service 102 via the network 120. Such computing devices can generally include wireless mobile devices (e.g., smart phones, PDAs, tablets, wearable computing devices, or the like), servers, desktops, laptops, game platforms or consoles, electronic book readers, television set-top boxes, televisions (e.g., internet TVs) and computerized appliances, to name a few. Further, such computing devices can implement any type of software (such as a browser or a mobile media application) that can facilitate the communications described above.

Third party consumers 140 may correspond to visitors to a commerce or other network site, designers, architects or the like, and can be associated with any computing device(s) that can facilitate communication with the image processing service 102 via the network 120. Such computing devices can generally include wireless mobile devices (e.g., smart phones, PDAs, tablets, wearable computing devices, or the like), servers, desktops, laptops, game platforms or consoles, electronic book readers, television set-top boxes, televisions (e.g., internet TVs) and computerized appliances, to name a few. Further, such computing devices can implement any type of software (such as a browser or a mobile media application) that can facilitate the communications described above.

A third party data provider 150 may correspond to any entity that provides information related to hues, colors, color names, color palettes, items, images, or the like. The third party data providers 150 may correspond to a social network site, a survey provider, a color statistics provider, a fashion information provider or the like, and can be associated with any computing device(s) that can facilitate communication with the image processing service 102 via the network 120. Such computing devices can generally include wireless mobile devices (e.g., smart phones, PDAs, tablets, wearable computing devices, or the like), servers, desktops, laptops, game platforms or consoles, electronic book readers, television set-top boxes, televisions (e.g., internet TVs) and computerized appliances, to name a few. Further, such computing devices can implement any type of software (such as a browser or a mobile media application) that can facilitate the communications described above.

One skilled in the relevant art will appreciate that the components and configurations provided in FIG. 1 are illustrative in nature. Accordingly, additional or alternative components and/or configurations, including the additional components, systems and subsystems for facilitating functions disclosed herein, may be utilized.

Figure 2:
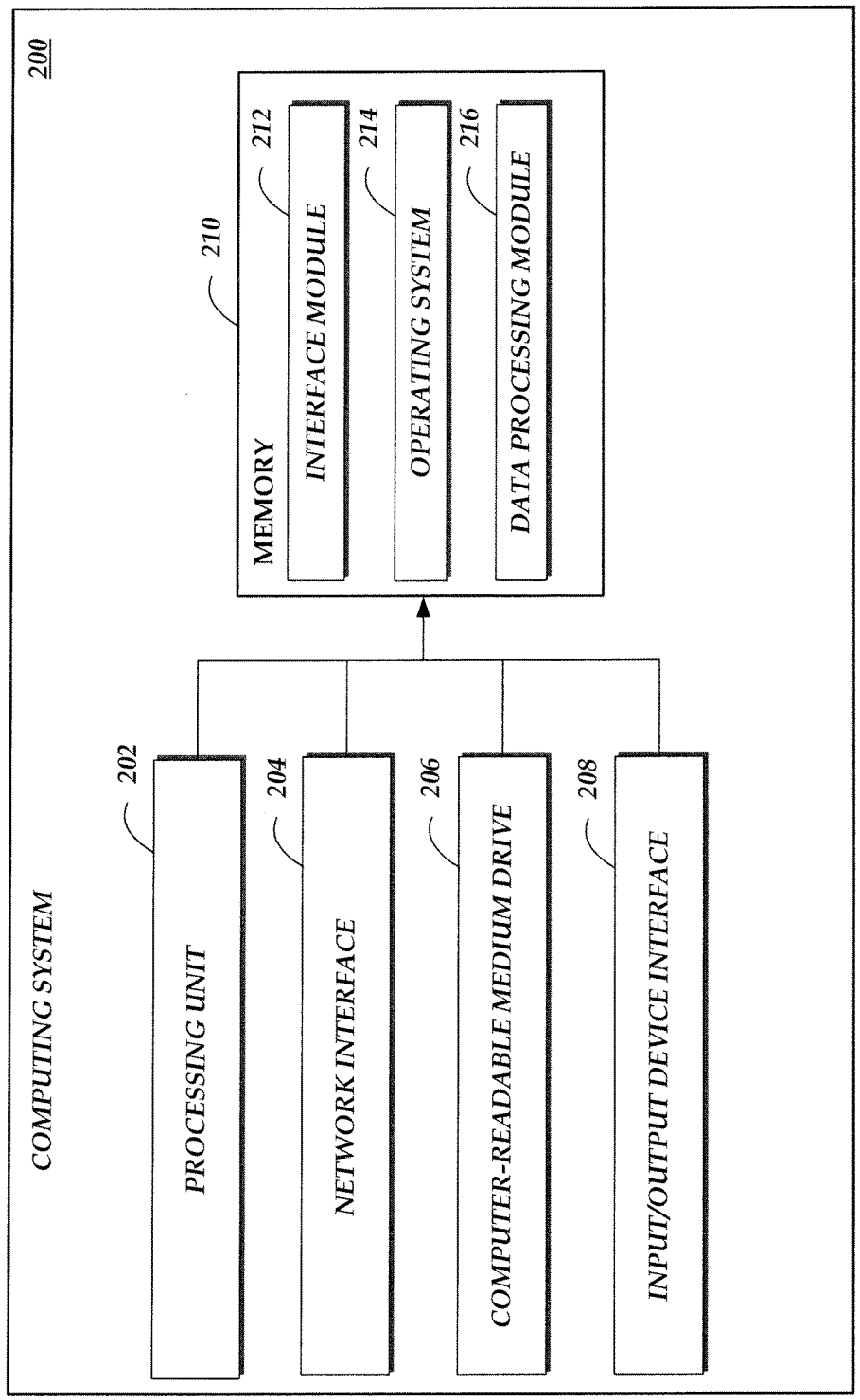
FIG. 2 is a block diagram illustrating an embodiment of example components of a computing system utilized in accordance with the operating environment of FIG. 1.

FIG. 2 is a block diagram illustrating an embodiment of example components of a computing system 200 capable of implementing an image processing service 102 utilized in accordance with the operating environment 100 of FIG. 1. The example computing system 200 includes an arrangement of computer hardware and software components that may be used to implement aspects of the present disclosure. Those skilled in the art will appreciate that the computing system 200 may include more (or fewer) components than those depicted in FIG. 2. It is not necessary, however, that all of these generally conventional components be shown in order to provide an enabling disclosure.

In the illustrated embodiment, the computing system 200 includes a processing unit 202, a network interface 204, a non-transitory computer-readable medium drive 206, and an input/output device interface 208, all of which may communicate with one another by way of a communication bus. The network interface 204 may provide the image processing service 102 with connectivity to one or more networks or computing systems. The processing unit 202 may thus receive information and instructions from other computing devices, systems or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the image processing service 102. The memory 210 may further include other information for implementing aspects of the present disclosure.

In one embodiment, the memory 210 includes an interface module 212. The interface module 212 can be configured to facilitate generating one or more user interfaces through which an image source provider 130, a third party consumer 140 or a third party data provider 150 utilizing a compatible computing device, may send to, or receive from, the image processing service 102 image data, palette data, instruction data, metadata, color or hue related data, etc., or otherwise communicate with the image processing service 102. Specifically, the interface module 212 can be configured to facilitate the functions described herein, including obtaining color image data, determining representative hue, determining representative colors, identifying corresponding color names, etc. Illustratively, the user interface can be implemented as a graphical user interface (GUI), network-based user interface, computer program, smartphone or tablet program or application, touchscreen, wearable computing device interface, command line interface, gesture, voice, or text interface, etc., or any combination thereof.

In addition, the memory 210 may include a data processing module 216 that may be executed by the processing unit 202. In an example embodiment, the data processing module 216 implements aspects of the present disclosure. For example, the data processing module 216 can be configured to process image data, color or hue related data, color name data, instructions, palette data or metadata, and to determine representative hues, representative colors, or color names.

It should be noted that the image processing service 102 may be implemented by some or all of the components present in the computing system 200 as discussed herein with respect to FIG. 2. In addition, the computing system 200 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that the modules may be implemented by two or more modules and in a distributed manner. As another example, the computing system 200 and its components can be implemented by network servers, application servers, database servers, combinations of the same, or the like, configured to facilitate data transmission to and from image source providers 130, third party consumers 140, or third party data providers 150, via network 120. Accordingly, the depictions of the modules are illustrative in nature.

Example Representative Hue Determination Process

Figure 3:
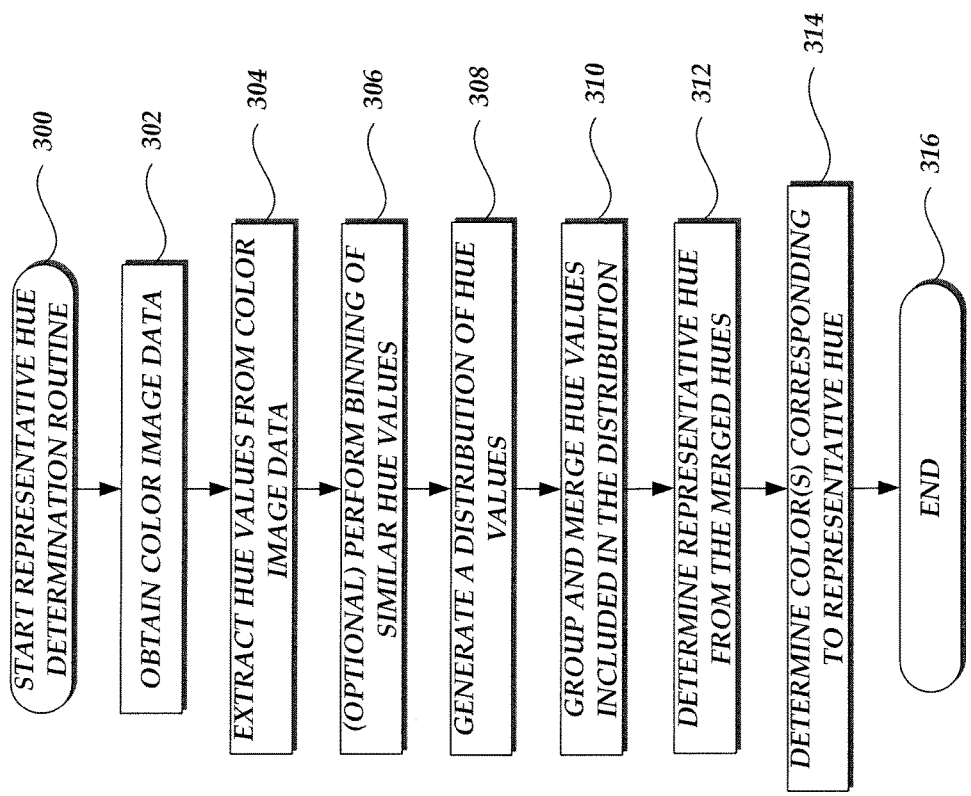
FIG. 3 is a flow diagram illustrating an embodiment of a representative hue determination routine implemented by the image processing service.

FIG. 3 is a flow diagram illustrating an embodiment of a representative hue determination routine implemented by the image processing service 102. The routine begins at block 300. At block 302, the image processing service 102 obtains data corresponding to a color image. The color image data can be a color image in its original format or a pre-processed format. For example, the color image data can correspond to an equation or table mapping illumination to x-y coordinates, a pixelized image, or other formats. In one embodiment, the data is represented by a number of pixels organized in a two-dimensional array. The pixels can be associated with a value, which can be a vector based on a primary color model (e.g., RGB) or a luminance-chrominance model (e.g., Y'UV, YUV, YCbCr or YPbPr).

The color image data can also correspond to other representations of colors depicted by the color image, with or without associated metadata. Illustratively, the color image data can be a color palette generated from the color image. For an example of generating a color palette from a color image, see U.S. patent application Ser. No. 14/316,483, entitled "IMAGE-BASED COLOR PALETTE GENERATION," filed on Jun. 26, 2014, which is incorporated by reference herein in its entirety.

Illustratively, the image processing service 102 can obtain the color image data by receiving the data from image source providers 130 or by locating and retrieving color palette data from the palette data store 110. In some embodiments, obtained color image data may need to be manually, semi-manually, semi-automatically, or automatically assessed and filtered so as to only retain color data relevant to determination of representative hues.

Metadata associated with the color image data can also be obtained. The metadata may include information corresponding to the colors, lighting source, lighting direction, or other factors regarding the color rendering of the image. The metadata may also include information about the color images corresponding to the obtained data, other color images, subjects or category of subjects depicted, sources contributing to the image, or their interrelations. Metadata can also indicate the format, semantics, features, conditions, sources, date of creation/editing, associated demographics (e.g., geographical region, age, gender, ethnic group, religion, culture, etc.), or the like. The metadata can further include any other information associated with the color image as can be envisioned by a person of skill in the art.

In some embodiments, the image processing service 102 can develop or derive, from the obtained data and/or metadata, contextual criteria applicable to the determination of representative hues, identification of corresponding colors or color names, or other processes disclosed herein. The criteria may indicate various preferences, factors, parameters, thresholds, or requirements that facilitate or control the representative hue determination routine of FIG. 3, the color name identification routine of FIG. 5, or other relevant routines or subroutines. For example, the criteria may indicate a preferred color circle for hue-related computation. The preferred color circle may be associated with a culture or context of the image that emphasize certain pure colors. As another example, the criteria can identify a hue distance formula or can include one or more thresholds of hue distance for merging similar hues in order to determine a representative hue.

At block 304, the image processing service 102 extracts hue values from the color image data. Illustratively, if an original or pre-processed color image is obtained, hue values can be extracted from color values associated with each pixel of the image. The color values may be vectors in a color space as discussed earlier. For example, the color values can be vectors in an RGB, Y'UV, YUV, YCbCr or YPbPr based color space. The color values can also be represented or transformed into other mathematical formats, for example, based on various data compression techniques. Illustratively, the image processing service 102 can convert representation of the color values into a vector in an HSB space, or simply compute a hue value based on a corresponding three-dimensional color value using an applicable mathematical formula. An example formula for calculating hue value from an RGB color value is as follows:

Given $R'=R/255$, $G'=G/255$, $B'=B/255$ $Cmax=\max(R',G',B')$, $Cmin=\min(R',G',B')$, $\Delta=Cmax-Cmin$ Hue Calculation:

$$H = \begin{cases} 60° \times \left(\frac{G'-B'}{\Delta} \bmod 6\right), & Cmax = R' \\ 60° \times \left(\frac{B'-R'}{\Delta} + 2\right), & Cmax = G' \\ 60° \times \left(\frac{R'-G'}{\Delta} + 4\right), & Cmax = B' \end{cases}$$

In some embodiments, the color image data obtained is in the form of a color palette. As described earlier, a color palette includes a collection of color values and their associated weights. The color values may also be vectors in a color space, such as an RGB space. Accordingly, similar color space conversion or hue calculation formula(e) can be employed to extract hue values from a color palette.

At block 306, extracted hue values can optionally be merged or binned in various ways to facilitate the generation of a hue distribution for colors depicted in the image. For example, a set of standardized hues can be determined by the image processing service 102, as a basis for binning hues and generating a hue distribution therefrom. Illustratively, the set of standardized hues can correspond to 36 hue values at 0 degrees, 10 degrees, 20 degrees . . . and 350 degrees, that evenly divide a corresponding color circle. Each standardized hue value can be associated with a threshold. An extracted hue value is placed in a bin corresponding to a distinct standardized hue if a similarity measure of the two falls within the associated threshold. After binning, extracted hue values are represented by their corresponding standardized hues. The set of standardized hues can be made consistent for a particular category of color image data (e.g., based on the subject or context of the color image as derived from associated metadata), as a way to calibrate the representative hue determination process. It should be noted that the set of standardized hues may or may not be uniformly distributed on a color circle, and thresholds associated with individual standardized hues may or may not be the same. Further, in some embodiments, extracted hue values can be binned with one another if their respective similarity measure falls within a threshold, without requiring standardized hues.

At block 308, a distribution of hue values is generated. For example, the distribution can be a histogram representing a number of pixels corresponding to distinct hue values extracted from the color image data, with or without binning. As another example, the distribution can be a percentage breakdown of distinct hue values derived from the color image data, with or without binning.

At block 310, hue values included in the distribution are grouped and merged for determining a hue or range of hues representative of the color image. Various clustering methods, such as k-means, mean-shift, expectation-maximization or the like, can be utilized by the image processing service 102 to group the hues. When applied to certain employed clustering methods, in some embodiments, distance between any two hue values can be defined as the shortest arc or the smallest angle between the two hue values on a corresponding color circle. For example, the distance between HUE 1 at 10 degrees and HUE 2 at 350 degrees is 20 degrees. Upon grouping or clustering the hues included in the distribution, each group of hue values may be represented by a respective group hue. The group hue may be a merged, single hue value (e.g., a weighted average of the group of hues.) Alternatively or in addition, the group hue may be a range of hue values. The range can be calculated based on various statistics of the respective group of hue values to cover a portion of a corresponding color circle. For example, for each respective group, a corresponding group hue may be a range of two standard deviations centered at the mean hue value of the group.

At block 312, the image processing service 102 determines a representative hue for the color image from the group hues. In some embodiments, the representative hue can be selected based on a dominance of the groups. For example, the group hue corresponding to the most dominant group can be selected. The most dominant group may account for the largest portion of the hue distribution as compared to other groups.

In some embodiments, the representative hue may correspond to the group hue of a most concentrated group. A concentration formula can be designed or adopted. For example, an intra-group similarity measure, such as the mean of pairwise hue distance, can be calculated. The group of hues whose constituents are most similar to one another can be picked, and the corresponding group hue can be selected as the representative hue.

In other embodiments, the image processing service 102 may determine more than one representative hue. For example, the group hues can be sorted or ordered based on dominance, concentration, any applicable criteria developed or derived from one or more of the obtained color image data or metadata as discussed above. Illustratively, the top three group hues may then be selected as representative hues. In still other embodiments, the image processing service 102 may generate a hue palette to include all group hues and their respective group size or weight, and associate the hue palette with the color image. The hue palette can be stored, for example, in the palette data store 110.

At block 314, the image processing service 102 determines one or more representative colors corresponding to the representative hue. In some embodiments, the image processing service 102 identifies all the hue values included in the group of hues that corresponds to the representative hue. The image processing service 102 can further identify distinct colors included in the obtained color image data (e.g., distinct colors corresponding to the pixels of the color image, distinct palette colors included in a color palette derived from the color image, etc.) that correspond to the hue values included in the group. Based on the weight (e.g., number of pixels) associated with these distinct colors, a weighted average color can be calculated as the representative color corresponding to the representative hue.

In other embodiments, the image processing service 102 may determine a threshold of hue distance based on any applicable criteria developed or derived from the obtained color image data and/or metadata as discussed above. Hue values within the threshold distance from the representative hue may be considered sufficiently similar to the representative hue. The image processing service 102 may then identify distinct colors included in the color image data that correspond to hue values similar to the representative hue. The image processing service 102 may further calculate a weighted average color of the identified distinct colors and label the average color as a representative color.

In still other embodiments, the image processing service 102 may determine more than one representative color corresponding to the representative hue. For example, colors of a same or similar hue may vary greatly in terms of saturation or brightness, when represented in an HSB space. The image processing service 102 may determine a measure of divergence, such as an average pairwise distance of color values on the S-B plane, among the colors that are identified for a representative hue. If the divergence measure is larger than a determined threshold, various clustering or grouping methods can be applied to determine multiple merged colors that correspond to the representative hue. For an example of determining multiple representative colors from color image data, see U.S. patent application Ser. No. 14/316,483, entitled "IMAGE-BASED COLOR PALETTE GENERATION," filed on Jun. 26, 2014, which is incorporated by reference herein in its entirety.

In further embodiments, representative colors corresponding to the representative hue can be determined based on color-related voting or surveys. A popularity of colors among a group of users can be obtained from one or more third party data providers 150 to facilitate the color determination. For example, popularity of colors can be incorporated as a coefficient into any method for calculating a weighted average of distinct colors. Illustratively, the popularity of colors can be determined based on user votes on a variety of colors included in color image data. As another example, the popularity of colors can be determined based on user votes on one or more colors that users think are most distinct from, or compatible with, one or more predetermined colors corresponding to the representative hue.

In still further embodiments, the representative color or colors corresponding to the representative hue may be associated with a subject depicted in the color image, such as an item for sale. Illustratively, color(s) attributable to the background of the color image may be excluded from color palette data of the color image. For an example of excluding background color from a color image based palette, see U.S. patent application Ser. No. 14/316,483, entitled "IMAGE-BASED COLOR PALETTE GENERATION," filed on Jun. 26, 2014, which is incorporated by reference herein in its entirety. A representative hue determined from the color palette data may therefore have a high probability of matching the subject of the color image, based on dominance, concentration, or other criteria. The matching can be enhanced by analyzing applicable metadata associated with the representative hue, the color image data, the color palette, the subject depicted in the color image, etc. For example, applicable metadata may indicate that the representative hue corresponds to a large area located close to the center of the color image, which is usually where a subject is depicted. Accordingly, the one or more representative colors corresponding to the representative hue may be labeled as item color(s) or product color(s) and stored as part of the metadata associated with the color image or the subject depicted. The routine of FIG. 3 ends at block 316.

Figure 4:
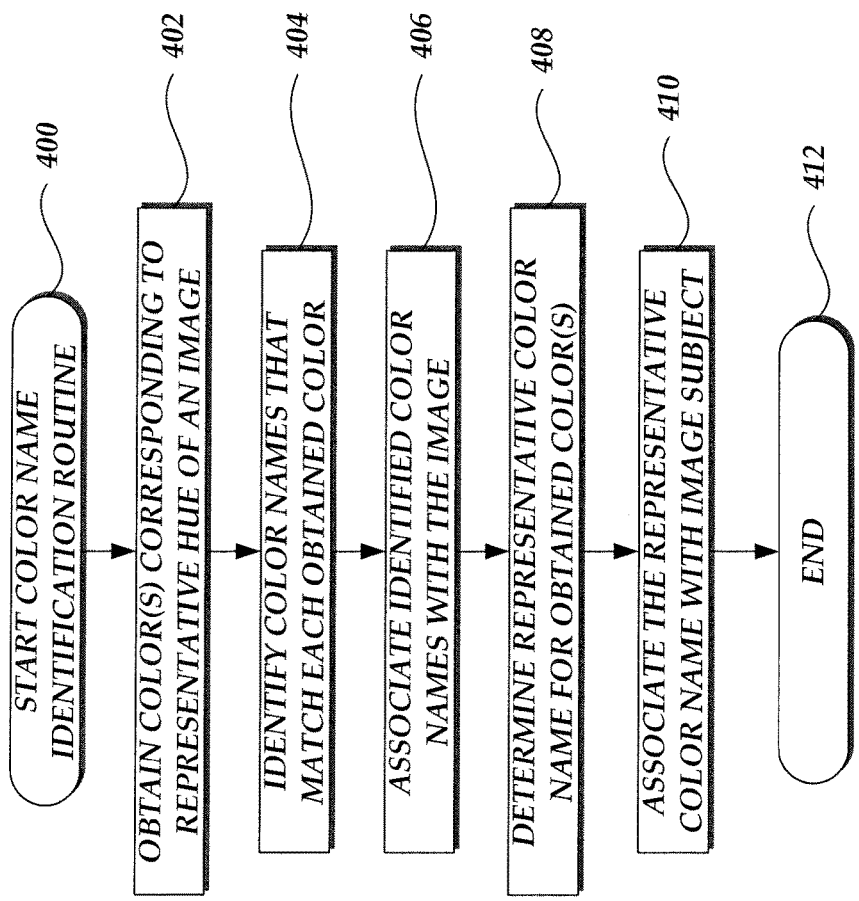
FIG. 4 is a flow diagram illustrating an embodiment of a color name identification routine implemented by the image processing service.

FIG. 4 is a flow diagram illustrating an embodiment of a color name identification routine implemented by the image processing service 102. The routine begins at block 400. At block 402, the image processing service 102 obtains one or more colors corresponding to a representative hue of a color image. As described above, the image processing service 102 may achieve this by implementing the routine of FIG. 3.

Referencing FIG. 4 at block 404, the image processing service 102 identifies color names that match each of the obtained colors. The image processing service 102 may achieve this by utilizing data maintained by the color name data store 115. As described earlier, the color name data store 115 can store data regarding relationships between a collection of color names and colors in a color space. The relationships can be simple one-to-one, one-to-multiple, multiple-to-one, multiple-to-multiple mappings. The relationships may also be hierarchical, probabilistic, or otherwise fuzzy. The relationships can optionally be associated with weights, conditions, contexts, sources, dates of creation/editing, other associated metadata (e.g., geographical region, age, gender, ethnic group, religion, culture, language, dialect, preferences, social communities or networks, etc. of sources that contributed to the data), or the like.

Figure 5:
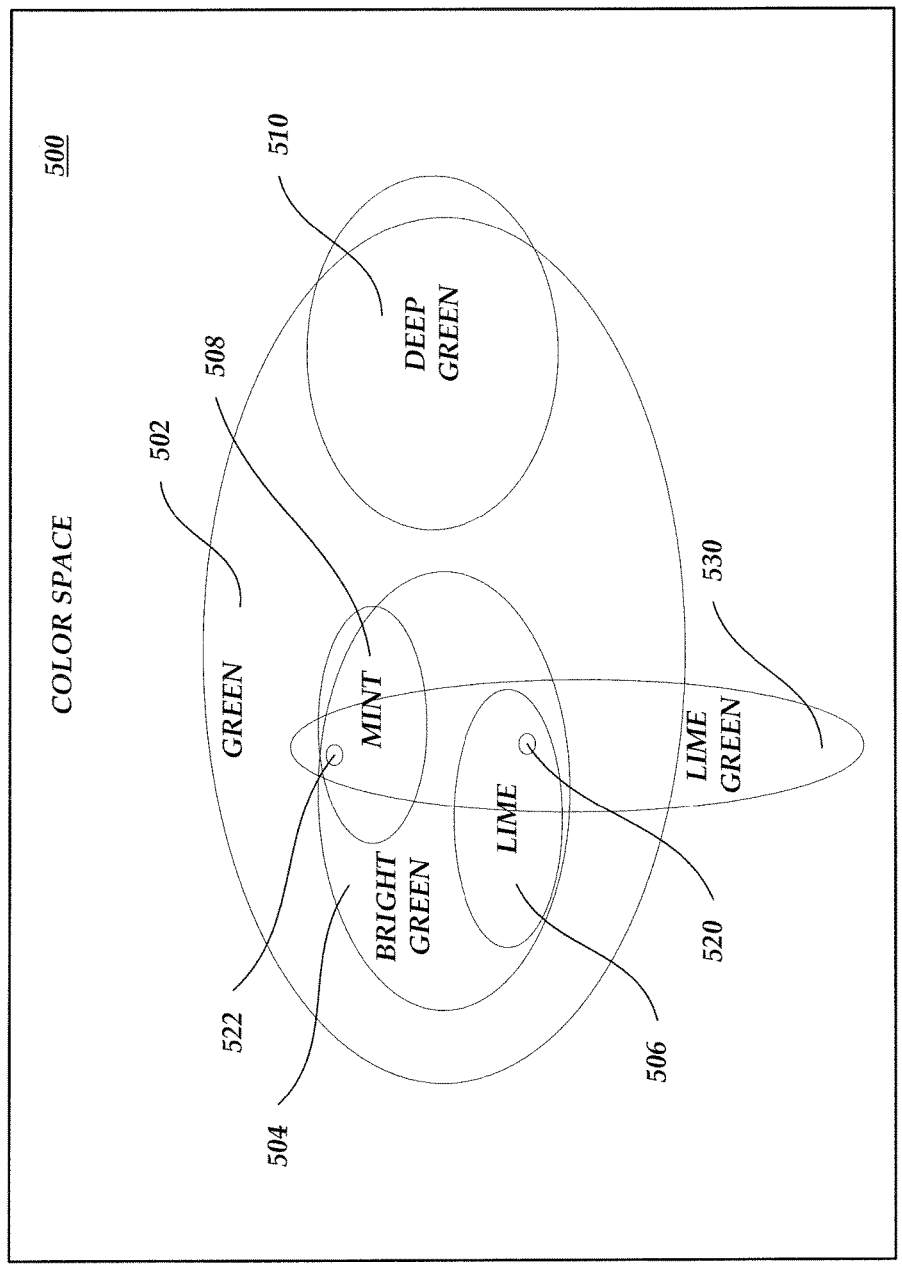
FIG. 5 is a simplified block diagram illustrating an example of relationships between color names and colors in a color space.

For example, FIG. 5 is a simplified block diagram illustrating an example of relationships between color names and colors in a color space 500. Illustratively, the color space 500 can be an RGB space. In accordance with this example, color name "GREEN" is mapped to all color values inside region 502 of the color space 500. Region 502 completely encompasses region 504, which is mapped to color name "BRIGHT GREEN." Region 504 in turn completely encompasses region 506 mapped to color name "LIME." In this case, color name "GREEN" may be considered more general than color name "BRIGHT GREEN" and "BRIGHT GREEN" more general than "LIME." In other words, "LIME" may be considered more specific than "BRIGHT GREEN" and "BRIGHT GREEN" more specific than "GREEN."

With continued reference to FIG. 5, region 502 partially encompasses region 510, which is mapped to color name "DEEP GREEN." Also, region 504 partially encompasses region 508, which is mapped to color name "MINT." In this case, color name "GREEN" may not be considered more general than color name "DEEP GREEN" and "BRIGHT GREEN" may not be considered more general than the color name "MINT," depending on applicable logic to determine hierarchies. Illustratively, a threshold measure regarding the respective two intersecting regions (e.g., a threshold ratio between areas of the overlapping region and the smaller of the two regions) can be utilized to make this determination.

In this example, the small circular regions 520 and 522 may correspond to two obtained colors as represented in the color space 500. Illustratively region 520 is located within regions 506, 504, 502 and 530. Accordingly, respective color names corresponding to the regions, i.e., "LIME," "BRIGHT GREEN," "GREEN" and "LIME GREEN" can all be identified as matching the color of region 520. Also, region 522 is located within regions 508, 504, 502 and 530. Therefore, respective corresponding color names "MINT," "BRIGHT GREEN," "GREEN" and "LIME GREEN" can all be identified as matching the color of region 522.

Referencing back to FIG. 4, at block 406, the image processing service 102 associates at least a subset of identified color names with the color image. In some embodiments, the image processing service 102 may store the subset of color names as metadata associated with the color image, with or without hierarchy information. In other embodiments, the image processing service 102 may cause the color image to be indexed based on the subset of color names so that search queries including one of the subset of color names can lead to retrieval of the color image. It should be noted that the color image can be associated with other color names, such as those identified based on another representative hue of the color image, or based on palette colors included in a color palette corresponding to the color image.

At block 408, the image processing service 102 determines a representative color name for the obtained colors. If only one color is obtained at block 402, the representative color name may be a most specific color name matching the obtained color. If multiple colors are obtained at block 402, the representative color name may be a color name that matches a majority or all of the obtained colors. Continuing the example above with reference to FIG. 5 where small regions 520 and 522 correspond to two obtained colors, the common color name may correspond to a region in the color space 500 that encompasses both regions 520 and 522. In some embodiments, the representative color name is determined as the most specific color name that matches at least a majority of the obtained colors. Continuing the example above, the representative color name in these embodiments may be "BRIGHT GREEN" corresponding to region 504, which is a most specific region that encompasses both regions 520 and 522. In other embodiments, the representative color name may be a more general color name that matches at least a majority of the obtained colors. Illustratively, in these embodiments the representative color name may be "GREEN" corresponding to region 502.

It should be noted that there may be multiple most specific or more general color names that can be determined as candidates for representative color name. For example, "LIME GREEN" corresponding region 530 may also be considered a most specific and common color name for the colors of regions 520 and 522. In these cases, the image processing service 102 may select one or more of the candidates as representative color name(s) based on the various criteria, preferences or biases that are related to language, country, geographic region, ethnic group, social community, gender, age, time, trend, item, category of items, service, category of services, design, category of designs, color popularity, related item sales, or the like, as described earlier.

Referencing FIG. 4 at block 410, the image processing service 102 associates the representative color name(s) with a subject depicted in the color image. For example, the representative color name may be labeled as a color name of an item for sale as depicted by the color image. The representative color name may also be stored as metadata associated with the item for sale, which may supplement or revise color name information provided by a supplier or vendor of the item. The routine of FIG. 4 ends at block 412.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for determining color names for a color image based at least in part on hue, the computer-implemented method comprising:
   under control of a hardware computing device configured with specific computer executable instructions,
   obtaining color data corresponding to a color image;
   generating a hue distribution from the color data, wherein the hue distribution comprises a plurality of distinct hue values each associated with a hue weight;

modifying the hue distribution based, at least in part, on merging two or more hue values in the hue distribution in accordance with respective hue weights associated with the two or more hue values and in accordance with a hue distance, wherein the hue distance is defined as the shortest arc or smallest angle between the two or more hue values on a corresponding color circle;

determining a representative hue based, at least in part, on the modified hue distribution;

identifying one or more color values from the color data, wherein the identified one or more color values are attributable to the representative hue;

determining a representative color from the identified one or more color values;

identifying one or more color names corresponding to the representative color; and associating the one or more color names with the color image.

2. The computer-implemented method of claim 1, wherein the color data includes a color palette generated based, at least in part, on the color image.

3. The computer-implemented method of claim 2, wherein the color palette includes a plurality of palette color values in a color space, wherein each palette color value of the plurality of palette color values is associated with a palette color weight.

4. The computer-implemented method of claim 3, wherein the one or more color values are identified from the plurality of palette color values.

5. The computer-implemented method of claim 1, wherein the color data includes RED GREEN BLUE ("RGB") color values represented in an RGB color space and wherein generating the hue distribution comprises at least partially converting representation of the color values from the RGB color space to a Hue-Saturation-Brightness ("HSB") color space.

6. A computer-implemented method comprising:
   under control of a hardware computing device configured with specific computer executable instructions,
      generating a hue distribution from color data corresponding to a color image, wherein the hue distribution comprises a plurality of distinct hue values each associated with a hue weight;
      modifying the hue distribution based, at least in part, on merging two or more hue values in the hue distribution in accordance with respective hue weights associated with the two or more hue values and in accordance with a hue distance, wherein the hue distance is defined as the shortest arc or smallest angle between the two or more hue values on a corresponding color circle;
      determining a representative hue based, at least in part, on the modified hue distribution;
      determining a representative color from the color data based, at least in part, on the representative hue; and
      associating one or more color names with the color image based, at least in part, on the representative color.

7. The computer-implemented method of claim 6, wherein the representative hue corresponds to at least one of a hue value or a range of hue values.

8. The computer-implemented method of claim 6 further comprising:
   binning the plurality of hue values in accordance with a set of standardized hue values;
   wherein the generating the hue distribution is based, at least in part, on the binned plurality of hue values.

9. The computer-implemented method of claim 8, wherein the binning of the plurality of hue values is consistent for a set of color images based, at least in part, on metadata associated with the set of color images.

10. The computer-implemented method of claim 6, wherein the representative hue is further determined based, at least in part, on at least one of a dominance corresponding to the modified hue distribution or a concentration corresponding to the modified hue distribution.

11. A system comprising:
   a data store configured to at least store computer-executable instructions; and
   a hardware processor in communication with the data store, the hardware processor configured to execute the computer-executable instructions to at least:
      generate a hue distribution from color data corresponding to a color image, wherein the hue distribution comprises a plurality of distinct hue values each associated with a hue weight;
      modify the hue distribution based, at least in part, on merging two or more hue values in the hue distribution in accordance with respective hue weights associated with the two or more hue values and in accordance with a hue distance, wherein the hue distance is defined as the shortest arc or smallest angle between the two or more hue values on a corresponding color circle;
      determine a first representative hue based, at least in part, on the modified hue distribution;
      determine a first representative color from the color data based, at least in part, on the first representative hue; and
      associate one or more color names with the color image based, at least in part, on the first representative color.

12. The system of claim 11, wherein the hardware processor is further configured to execute the computer-executable instructions to at least identify at least one second representative hue based, at least in part, on the modified hue distribution.

13. The system of claim 12, wherein the hardware processor is further configured to execute the computer-executable instructions to at least generate a hue palette corresponding to the color image, wherein the hue palette includes the first and second representative hues.

14. The system of claim 11, wherein the hardware processor is further configured to execute computer-executable instructions to at least determine at least one second representative color from the color data based, at least in part, on the first representative hue.

15. The system of claim 14, wherein the at least one second representative color is determined in accordance with a divergence measure of color values included in the color data that are attributable to the first representative hue.

16. A non-transitory computer readable storage medium storing computer executable instructions that when executed by a processor perform operations comprising:
   generating a hue distribution from color data corresponding to a color image, wherein the hue distribution comprises a plurality of distinct hue values each associated with a hue weight;
   modifying the hue distribution based, at least in part, on merging two or more hue values in the hue distribution in accordance with respective hue weights associated with the two or more hue values and in accordance with a hue distance, wherein the hue distance is defined as the shortest arc or smallest angle between the two or more hue values on a corresponding color circle;

determining a representative hue based, at least in part, on the modified hue distribution;

determining a representative color from the color data based, at least in part, on the representative hue; and associating one or more color names with the color image based, at least in part, on the representative color.

17. The non-transitory computer readable storage medium of claim 16, wherein the color data corresponding to the color image includes a color palette corresponding to the color image.

18. The non-transitory computer readable storage medium of claim 16, wherein the operations further comprise determining a contextual criterion associated with the color image.

19. The non-transitory computer readable storage medium of claim 18, wherein the contextual criterion corresponds to at least one of a subject depicted by the color image, category of the subject depicted, source contributing to the color image, geographical region, age, gender, ethnic group, religion, or culture.

20. The non-transitory computer readable storage medium of claim 18, wherein at least one of determining the representative hue, determining the representative color, or associating the one or more color names with the color image is based, at least in part, on the contextual criterion.

* * * * *